(12) United States Patent
Shink et al.

(10) Patent No.: US 9,353,008 B2
(45) Date of Patent: May 31, 2016

(54) STRUCTURAL LIGHTWEIGHT CONCRETE OR MORTAR, METHOD FOR MANUFACTURING SAME AND USE THEREOF AS SELF-PLACING CONCRETE

(71) Applicants: Melanie Shink, Versailles (FR); Abdelghafour Ait Alaiwa, Mantes la Jolie (FR)

(72) Inventors: Melanie Shink, Versailles (FR); Abdelghafour Ait Alaiwa, Mantes la Jolie (FR)

(73) Assignee: CIMENTS FRANCAIS, Paris la Defense (FR)

( * ) Notice: Subject to any disclaimer, the term of this patent is extended or adjusted under 35 U.S.C. 154(b) by 0 days.

(21) Appl. No.: 14/361,060

(22) PCT Filed: Nov. 30, 2012

(86) PCT No.: PCT/FR2012/052761
§ 371 (c)(1),
(2) Date: May 28, 2014

(87) PCT Pub. No.: WO2013/079877
PCT Pub. Date: Jun. 6, 2013

(65) Prior Publication Data
US 2014/0336305 A1  Nov. 13, 2014

(30) Foreign Application Priority Data

Dec. 1, 2011 (FR) ...................... 11 61028

(51) Int. Cl.
| | | |
|---|---|---|
| C04B 28/02 | (2006.01) | |
| C04B 28/04 | (2006.01) | |
| C04B 28/06 | (2006.01) | |
| C04B 38/08 | (2006.01) | |
| C04B 40/00 | (2006.01) | |
| C04B 38/00 | (2006.01) | |
| C04B 111/00 | (2006.01) | |
| C04B 111/40 | (2006.01) | |

(52) U.S. Cl.
CPC ................ C04B 28/04 (2013.01); C04B 28/02 (2013.01); C04B 28/065 (2013.01); C04B 38/0067 (2013.01); C04B 38/08 (2013.01); C04B 40/0039 (2013.01); C04B 40/0046 (2013.01); C04B 2111/00103 (2013.01); C04B 2111/40 (2013.01); C04B 2201/20 (2013.01); C04B 2201/32 (2013.01); Y02W 30/64 (2015.05); Y02W 30/92 (2015.05)

(58) Field of Classification Search
CPC ...... C04B 28/02; C04B 28/04; C04B 28/065; C04B 38/0067
USPC ............ 106/713–771; 523/218–220; 524/2–8
See application file for complete search history.

(56) References Cited

U.S. PATENT DOCUMENTS

| 4,126,470 A | 11/1978 | Braun et al. |
|---|---|---|
| 4,131,480 A | 12/1978 | McCurrich et al. |
| 8,394,192 B2 | 3/2013 | Meille et al. |
| 2010/0212551 A1* | 8/2010 | Meille et al. ................... 106/708 |
| 2011/0259247 A1* | 10/2011 | Walenta et al. ............... 106/769 |

FOREIGN PATENT DOCUMENTS

| FR | 2350313 A1 | 12/1977 |
|---|---|---|
| FR | 2364870 A1 | 4/1978 |
| FR | 2929270 A1 | 10/2009 |
| WO | 2004080912 A1 | 9/2004 |
| WO | 2009083809 A2 | 7/2009 |
| WO | 2011061383 A1 | 5/2011 |
| WO | 2011114036 A1 | 9/2011 |

OTHER PUBLICATIONS

Shi et al., "Mixture Proportioning and Properties of Self-Consolidating Lightweight Concrete Containing Glass Powder", ACI Materials Journal, Technical Paper, 2005, pp. 355-363, XP008077131.
Takahashi et al., "Compositions for highly thermal insulating high-strength lightweight concrete and manufacture of concrete thereof", 6001 Chemical Abstracts, 1993, vol. 118, No. 14, XP000401466.
International Search Report, dated May 24, 2013, from corresponding PCT application.

* cited by examiner

Primary Examiner — Edward Cain
(74) Attorney, Agent, or Firm — Sofer & Haroun, LLP

(57) ABSTRACT

Disclosed is a structural lightweight concrete or mortar composition which, in the fresh state, includes an hydraulic binder, aggregate, and water, characterized in that the composition includes: an hydraulic binder content including cement and optional additions, which is greater than or equal to 280 kg/m³ of fresh concrete, coarse aggregate and/or fine aggregate, a volume proportion of at least 70% of the fine and/or coarse aggregate consisting of fine and/or coarse lightweight particles, the actual dry density of which is between 800 and 1,600 kg/m³, the total amount of aggregate being greater than or equal to 500 L/m³ of fresh concrete, a superplasticizer, at least one thickening agent, and effective water in an effective water/hydraulic binder weight ratio of between 0.40 and 0.65. The composition can be used for producing a self-placing lightweight concrete.

20 Claims, No Drawings

STRUCTURAL LIGHTWEIGHT CONCRETE OR MORTAR, METHOD FOR MANUFACTURING SAME AND USE THEREOF AS SELF-PLACING CONCRETE

BACKGROUND OF THE INVENTION

1. Field of the Invention

The present invention relates to the field of structural lightweight concretes and mortars and more particularly to structural lightweight concrete or mortar compositions, to their process of manufacture and to the structural concretes or mortars thus obtained, as well as to their use as self-placing concrete.

2. Description of the Related Art

For several years, for better insulation of buildings, a search has been under way to produce concretes or mortars having low thermal conductivity. To this end, mortar compositions have been developed which include air-entraining adjuvants, a high air content making it possible to enhance the insulating thermal performance of the mortar, and/or compositions including light aggregates, such as pumice, expanded clays or expanded schists, exhibiting a high porosity which confers an insulating nature on the material.

However, this weight-reduction must not be made to the detriment of a reduction in the strength of the concrete or mortar and in particular of its compressive strength, which has to be at least 25 MPa after 28 days.

The difficulties increase during the preparation of concretes, when it is desired to increase their fluidities while preventing the phenomenon of bleeding and the segregation of the aggregates. These disadvantages are amplified in the case of self-placing concretes, for which a high fluidity is required.

Furthermore, the mechanical strength properties can be further affected by the replacement, for the purpose of improving the thermal performance of the material by reducing its density (and consequently its thermal conductivity), of all of the conventional aggregates (of high density) by lightweight aggregates, for example of expanded type.

SUMMARY OF THE INVENTION

It is an aim of the present invention to overcome the above-mentioned disadvantages by providing a concrete mortar composition which makes it possible to obtain, in the dry state, a lightweight concrete or mortar (concrete or mortar having a density, after drying in the oven, of less than 1500 kg/m$^3$), exhibiting a minimum compressive strength of 25 MPa after 28 days and a maximum thermal conductivity of 0.60 W/m·K, without phenomenon of segregation or of bleeding during the placing of the fresh concrete or mortar.

Another aim of the invention is to provide a lightweight structural concrete or mortar composition which can be used as self-placing concrete or mortar, that is to say a composition exhibiting a very fluid consistency.

To this end, the present invention relates to a lightweight structural concrete or mortar composition comprising, in the fresh state, a hydraulic binder, aggregates and water, characterized in that it comprises:
- a content of hydraulic binder, including cement and optional admixtures, of greater than or equal to 280 kg/m$^3$ of fresh concrete,
- coarse aggregates having a size of greater than 4 mm and/or fine aggregates having a particle size of less than or equal to 4 mm, a proportion by volume of at least 70% of said fine and/or coarse aggregates being composed of fine and/or coarse lightweight particles, the true density of which in the dry state is between 800 and 1600 kg/m$^3$, the total amount of aggregates being greater than or equal to 500 l/m$^3$ of fresh concrete,
- a superplasticizer,
- at least one viscosifying agent and
- effective water according to an effective water/hydraulic binder weight ratio of between 0.40 and 0.65 (the effective water being defined according to the standard EN 206-1).

The true density of the lightweight particles in the dry state (standard NF EN 13055-1 of December 2002 (Lightweight Aggregates), which refers, for the calculation method, to the standard EN 1097-6 of June 2001 (Tests for determining the mechanical and physical characteristics of aggregates)), has to be less than 1600 kg/m$^3$ in order to obtain a structural insulating lightweight concrete. There exist lightweight particles having a density of between 1600 and 2000 kg/m$^3$, but they do not make it possible to sufficiently lighten the concrete obtained to develop the insulating properties which are being sought for. The particles having a density of less than 800 kg/m$^3$ are too low in strength (they are easily crushed) to obtain a structural concrete having a minimum compressive strength of 25 MPa. The particles having a density of greater than 2000 kg/m$^3$ are particles used in conventional concretes, which are too heavy to be predominantly used in a lightweight concrete.

The proportion by volume of the fine and/or coarse lightweight particles corresponds to at least 70%, preferably at least 80% and more preferably at least 90% of the total volume of the aggregates. All of the aggregates can also be composed of fine and/or coarse lightweight particles.

The term "effective water" denotes the internal water of the concrete located between the grains of the solid backbone formed by the aggregates, the cement and the admixtures. The effective water thus represents the water necessary for the hydration and the achievement of the consistency. It is the total water from which the water absorbed by the aggregates is subtracted.

The strength of the lightweight concrete or mortar is controlled by the strength of the aggregates, including the fraction of lightweight aggregates, and by the strength of the cement matrix. The strength of the lightweight concrete or mortar is also intermittently linked to the difference in stiffness between these two phases and to their respective properties by volume.

The strength and the stiffness of the lightweight aggregates are controlled by the actual nature of the aggregates and by the expansion process when artificial aggregates are concerned; they are thus parameters which cannot normally be modified unless use is made of specific processes which can prove to be expensive.

The cement matrix, mainly composed of hydraulic binder and water, corresponds to the cured state of an assemblage of hydrates. The entanglement of these hydrates provides the cohesion of the concrete and confers, on this matrix, properties having performances in terms of strength and stiffness which vary as a function of the type of binder used and of the proportion of effective water.

With respect to the weight of binder, the more the proportion of effective water in the cement matrix increases, the more its porosity increases, which is generally reflected by a decrease in its density, in its strength and in its stiffness.

During the search for a solution to the problem of optimization of lightweight concrete, it proved to be particularly advantageous, contrary to normal practice, to combine lightweight aggregates with a cement matrix including a high content of effective water (volume of effective water advantageously of between 200 and 300 $l/m^3$ of fresh concrete, preferably from 205 to 275 $l/m^3$ of fresh concrete, more preferably from 210 to 250 $l/m^3$ of fresh concrete). This is because it has been found that a high content of effective water, which makes it possible to reduce the density of the cement matrix and consequently its stiffness, also contributes to reducing the difference in stiffness between the matrix and the lightweight aggregates. An elastically more homogeneous concrete is thus obtained, which concrete can exhibit a compressive strength of greater than 25 MPa at 28 days.

Furthermore, the thermal conductivity of the concrete varies proportionally to its density. Thus, the more water is added to the concrete, the more its density decreases in the fresh state and also in the cured state after drying, as the water, with a density lower than that of all the other constituents of the concrete, if it is introduced in excess, will not be completely bonded to the hydrates of the cement matrix and can evaporate. Specifically, during the drying of the concrete, the evaporation of excess effective water with respect to the amount necessary for the hydration of the cement and possible admixtures results in the formation of air-comprising porosities. These porosities of the cement matrix, and also the porosity introduced by the lightweight aggregates, are the cause of the low density of the dry concrete and of its thermal insulating properties.

In the case of the present invention, the lightweight concrete, once cured and dried, includes porosities. These porosities were created by water and not by air bubbles, as in the lightweight mortar or concrete compositions of the prior art. However, such a concrete is particularly sensitive to segregation and to bleeding, so that, in the presence of a superplasticizer, an adjuvant which increases the viscosity of the cement matrix has to be incorporated into the composition.

However, it is found that, in the presence of an amount of water of greater than 200 $l/m^3$, in order to obtain a fluid self-placing concrete, said concrete according to the invention does not exhibit, surprisingly, any segregation or bleeding.

Advantageously, the hydraulic binder comprises a cement chosen from CEM I, CEM II, CEM III, CEM IV and CEM V cements or a sulfoaluminous clinker or a mixture of these. For example, the hydraulic binder can be a cement comprising a mixture of a clinker of sulfoaluminous type and of a CEM I cement.

The proportion of hydraulic binder is preferably at least 300 $kg/m^3$ of fresh concrete, preferably at least 330 $kg/m^3$ of fresh concrete.

The term "admixture" denotes a material as described in the standard NF EN 206-1 of April 2004, section 3.1.23, that is to say a finely divided material used to improve certain properties or to confer specific properties. Admixtures combine virtually inert materials (devoid of pozzolanic effect) and materials having a pozzolanic nature (or latent hydraulic nature). Limestone fillers and siliceous fillers are examples of virtually inert admixtures. Fumed silicas, fly ash, blast furnace slags and metakaolins are examples of admixtures having a pozzolanic nature.

According to the invention, the hydraulic binder can also comprise admixtures, in the form of fine particles having a size of less than 125 micrometers, such as fillers chosen from limestone fillers, siliceous fillers, fumed silicas, fly ash, blast furnace slags and metakaolins.

In the composition according to the present invention, in a fraction of the fine and/or coarse aggregates composed of lightweight particles, said fine or coarse lightweight particles are mineral particles of natural or artificial origin chosen from pumice, expanded clays, expanded schists, expanded slags or expanded pelletized slags, expanded glasses, expanded aggregates based on marble, granite, slate (in particular ornamental stone byproducts), on expanded carbon or on ceramic or on a mixture of several of these.

The lightweight particles can also comprise organic particles of synthetic origin, such as polystyrene particles.

The fine lightweight particles are preferably expanded clays or expanded schists with a true density in the dry state of between 1000 $kg/m^3$ and 1400 $kg/m^3$.

The coarse lightweight particles are preferably expanded clay or schist gravel having a true density in the dry state of between 1000 and 1400 $kg/m^3$, with a maximum size of 14 mm and with a crush strength at least greater than 4 $N/mm^2$, preferably greater than 6 $N/mm^2$ and more preferably greater than 8 $N/mm^2$.

This crush strength performance contributes to the achievement of a compressive strength performance of at least 25 MPa after 28 days, preferably of at least 28 MPa after 28 days and more preferably 30 MPa after 28 days, for the cured concrete in the dry state.

According to an alternative form, it is possible to precondition the fine or coarse lightweight particles for the purpose of modifying their water-absorption capacity or their hydrophobicity. This treatment can be carried out by saturating or by coating said lightweight particles using a hydrophobic compound, such as a pure resin or a resin in the form of an emulsion, or such as an organic or inorganic gel. These treatments are known to a person skilled in the art (WO 2009/083809).

Advantageously, the total volume of the aggregates represents at least 530 $l/m^3$ of fresh concrete, preferably at least 560 $l/m^3$ of fresh concrete.

The viscosifying agent can be chosen from cellulose ethers, in particular polysaccharides, hydroxyalkylcelluloses, hydroxyethylcelluloses, methylcellulose, carboxymethylcellulose, hydroxyethylcellulose or ethylhydroxyethylcellulose, poly(ethylene oxide)s, polyvinyl alcohols or polyamides.

Preferably, said viscosifying agent is a hydroxyalkylcellulose, preferably a hydroxyethylcellulose, which is non hydrophobically modified.

Preferably, said viscosifying agent is a formulation as described in the application WO 2011/114036, in particular a formulation comprising hydroxethylcellulose, attapulgite and a siliceous filler in an aqueous $K_2CO_3$ solution and preferably the product Collaxim SF sold by Axim.

The proportion of said viscosifying agent advantageously represents between 0.05% and 2% of the weight of the cement, particularly between 0.3% and 1% of the weight of the cement, preferably between 0.3% and 0.5% of the weight of the cement.

The structural lightweight concrete or mortar composition according to the present invention comprises a superplasticizer which can be chosen from polynaphthalenesulfonates, polymelaminesulfonates, lignosulfonates and polycarboxylates, preferably a polycarboxylate derivative with polyethylene oxide side chains.

The content of superplasticizer is advantageously less than 2.5% by weight of the cement, preferably of between 0.3% and 2.5% by weight of the cement and more preferably of between 0.3% and 1% by weight of the cement.

Other adjuvants can be introduced into the composition of the present invention, for example an anti-shrink agent, such as a formulation of propylene oxide and ethylene oxide copolymers, for example the product Cim'antiretrait sold by Axim, in proportions of between 0.1% and 3% by weight, with respect to the cement, preferably between 0.5% and 2% by weight and more preferably between 1% and 1.5% by weight, with respect to the cement.

Surprisingly, the compositions according to the present invention, which do not include air-entraining agents, nevertheless make it possible to obtain lightweight concretes or mortars.

The present invention also relates to a process for the preparation of a structural lightweight insulating concrete or mortar composition, characterized in that it comprises, before the mixing of the constituents of the composition as described above, at least one stage in which the fraction of aggregates composed of lightweight particles is prewetted and saturated with water.

This prewetting can take place by stirring in water or by spraying with water. This is because, as the lightweight particles are porous, they absorb a major fraction of water which is subsequently evaporated to leave room for voids during the drying of the concrete. These voids confer insulating properties on the concrete or mortar thus prepared.

The present invention also relates to the structural lightweight concrete or mortar, the composition of which is described above and is prepared according to the process described above, characterized in that it exhibits a density of less than 1500 kg/m$^3$, preferably of less than 1400 kg/m$^3$, in the dry state and a thermal conductivity of less than or equal to 0.6 W/m·K, preferably of between 0.4 and 0.6 W/m·K.

The structural lightweight insulating concrete or mortar prepared from a composition as described above or according to the preceding process is characterized in that it exhibits a density of less than 1500 kg/m$^3$, preferably of less than 1400 kg/m$^3$, in the dry state and a compressive strength of at least 25 MPa after 28 days, preferably of at least 28 MPa after 28 days and more preferably of at least 30 MPa after 28 days.

The density in the dry state is determined on samples aged 28 days, having a constant weight after passing through a ventilated oven (temperature approximately 105° C.). The term "constant weight" denotes a variation in weight of less than 0.2% in 24 hours. This measurement protocol is in accordance with section 5.4 of the standard NF EN 12390-7 of April 2012 and makes it possible to characterize the lightweight concretes as defined in the standard NF EN 206-1 of April 2004, sections 3.1.8 and 5.5.2.

This concrete or mortar according to the present invention has an advantageous use as self-placing concrete or mortar.

DETAILED DESCRIPTION OF THE INVENTION

The present invention will be described in more detail using the examples below, mentioned by way of illustration.

EXAMPLES

In a first step, the true density in the dry state and the water absorption of the lightweight aggregates is determined according to standardized protocols (NF EN 13055-1 (December 2002) and EN 1097-6 (June 2001)).

Nevertheless, in order to refine these values, in the examples of the present patent application, the values for true density in the dry state and for water absorption of the lightweight aggregates were recalculated on the basis of several batches as differences were observed with the theoretical values forecast, which resulted in differences also between the theoretical density and the experimental density of the fresh concrete. For this, the following were taken into account: the total weight of the components incorporated in the concrete, the air content, measured on fresh concrete, and the density in the fresh state of the concrete thus obtained. This parameter is important in the context of the present invention as the absorption of the aggregates directly impacts the amount of effective water present in the composition, in addition to the true density of the aggregates, which directly impacts the volume of the aggregates.

Example 1

All the values shown (weight and volume) relate to a volume of fresh concrete of 1 m$^3$.

Formulation 345 kg/m$^3$ of CEM I 52.5 N CE CP2 NF (Gaurain),
148 kg/m$^3$ of Cendres Volantes Carling (Surchiste), i.e. 493 kg/m$^3$ of hydraulic binder,
414 kg/m$^3$ of expanded slatey-schist sand GEM "104" (true density determined in the dry state: 1.55 kg/l; water absorption at 24 h: 13%; particle size of less than or equal to 4 mm),
416 kg/m$^3$ of expanded slatey-schist gravel GEM "1048" (true density determined in the dry state: 1.46 kg/l; water absorption at 24 h: 5.5%; particle size of greater than 4 and less than or equal to 10 mm)
(All of the fine and coarse aggregates are composed here of lightweight aggregates),
1.73 kg/m$^3$ of Axim superplasticizer Cimfluid Adagio 4019 (based on polycarboxylate) (solids content 30% by weight), i.e. 0.5% by weight, with respect to the weight of cement,
1.73 kg/m$^3$ of Axim viscosifying agent Collaxim SF (based on hydroxyethylcellulose) (solids content 40%), i.e. 0.5% by weight, with respect to the weight of cement,
293 kg/m$^3$ of water, i.e. 216 kg/m$^3$ of effective water, that is to say an Effective water/Binder weight ratio of 0.44 (measured according to the standard EN 206-1).

Equipment and Method

The concrete was prepared in a laboratory.

The lightweight aggregates were presaturated with water for a period of time of greater than 24 hours before the mixing of the concrete. The water content of the aggregates was measured before carrying out the mixing so as to calculate the addition water of the concrete (the water contributed by the combined aggregates, as well as that contributed by the adjuvants in the aqueous phase, is subtracted from the total water).

The concrete was mixed with the addition water in a Skako Couvrot planetary mixer with a maximum capacity by volume of 90 liters. The kneading protocol followed the following stages:

Introduction of the aggregates, cement and fly ash;
The water and the adjuvants are preweighed and set aside;
Kneading for 30 seconds;
Introduction of ⅔ of the addition water over 30 seconds without halting the mixer;
Introduction of the remaining ⅓ of the addition water incorporating the viscosifying agent (in the case of Axim Collaxim SF, the retention time in the water before incorporation in the concrete must not exceed 2 minutes);
Introduction of the superplasticizer without halting the mixer;
Kneading for 2 minutes;
Emptying the mixer.

All the test specimens necessary for the characterization of the properties of the concrete in the cured state were prepared and then subjected to a curing in accordance with the standard NF EN 12390-2 (April 2012).

Characteristics of the Concrete in the Fresh or Cured State

Density in the fresh state according to NF EN 12350-6 (April 2012): 1617 kg/m³ of fresh concrete, Air content of the fresh concrete according to NF EN 12350-7 (April 2012): 5.5% by volume, Slumping with the Abrams cone according to NF EN 12350-2 (April 2012): 240 mm at the end of kneading, 220 mm at 60 minutes, Compressive strength according to NF EN 12350-3 (April 2012) (cylindrical test specimens with a diameter of 11 cm over a height of 22 cm): 5.8 MPa at 1 day, 24.2 MPa at 7 days and 33.7 MPa at 28 days, Three-point bending strength at 28 days according to NF EN 12390-5 (April 2012) (prismatic test specimen of 10 cm×10 cm×40 cm): 4 MPa at 28 days, Young's modulus at 28 days (cylindrical test specimens with a diameter of 16 cm over a height of 32 cm): 18200 MPa, Total shrinkage at 28 days (storage at 20° C. and 50% relative humidity): 600 μm/m, Other properties of the cured concrete after drying in an oven at 105° C. to constant weight:

Density after drying in the oven at 105° C.: 1385 kg/m³,

Thermal conductivity after drying in the oven at 105° C.: 0.58 W·m⁻¹·K⁻¹.

Example 2

All the values shown (weight and volume) relate to a volume of fresh concrete of 1 m³.

Formulation 330 kg/m³ of CEM I 52.5 N CE CP2 NF (Gaurain), 145 kg/m³ of Cendres Volantes Carling (Surchiste), i.e. a total of 475 kg/m³ of hydraulic binder, 384 kg/m³ of expanded clay sand AR 0/4 650 Argex (true density determined in the dry state: 1.40 kg/l; water absorption at 24 h: 19.9%), 332 kg/m³ of expanded clay gravel AM 4/8 650 Argex (true density determined in the dry state: 1.20 kg/l; water absorption at 24 h: 19.0%)

(All of the fine and coarse aggregates are composed here of lightweight aggregates), 1.06 kg/m³ of Axim superplasticizer Cimfluid Adagio 4019 (based on polycarboxylate) (solids content 30% by weight), i.e. 0.32%, with respect to the weight of cement, 1.65 kg/m³ of Axim viscosifying agent Collaxim SF (based on hydroxyethylcellulose) (solids content 40%), i.e. 0.5% by weight, with respect to the weight of cement, 378 kg/m³ of water, i.e. 238 kg/m³ of effective water, that is to say an Effective water/Binder weight ratio of 0.50.

Equipment and Method

The concrete was prepared in an industrial environment, in a concrete mixing plant for ready-mixed concrete equipped with a planetary mixer. Aggregate compartments were devoted to each of the Argex aggregates in order to carry out a prewetting with water for approximately 3 hours per day for 3 days, which was sufficient to saturate the aggregates. The aggregates were subsequently rehomogenized and then charged to the storage hoppers of the mixer of the concrete mixing plant. The water content of the aggregates was measured before manufacture of the concrete so as to calculate the addition water (the water contributed by the combined aggregates, as well as that contributed by the adjuvants in the aqueous phase, has to be subtracted from the total water).

All the starting materials, with the exception of the water and the adjuvants, were introduced into the mixer and then homogenized for 30 seconds. The water and the adjuvants (superplasticizer and viscosifying agent) were subsequently simultaneously added to the mixture using the automated system of the concrete mixing plant. The kneading was continued for a few tens of seconds after stabilization of the wattmeter (measuring the kneading power).

Characteristics of the Concrete in the Fresh or Cured State

Temperature of the fresh concrete: 11.2° C.,

Density in the fresh state according to NF EN 12350-6 (April 2012): 1667 kg/m³ of fresh concrete, Air content of the fresh concrete according to NF EN 12350-7 (April 2012): 7% by volume, Slumping with the Abrams cone according to NF EN 12350-2 (April 2012): 240 mm at the end of kneading, 240 mm after 30 minutes and 230 mm after 60 minutes, Compressive strength at 28 days according to NF EN 12390-3 (April 2012) (cylindrical test specimens with a diameter of 16 cm over a height of 32 cm): 32.8 MPa, Dry density after drying in the oven at 105° C.: 1370 kg/m³ of dry concrete, Thermal conductivity after drying in the oven at 105° C.: 0.46 W·m⁻¹·K⁻¹.

The above compositions in accordance with the present invention thus make it possible to obtain a structural concrete, having a high compressive strength at 28 days (greater than 32 MPa), despite a low density in the dry state, of less than 1500 kg/m³, indeed even of less than 1400 kg/m³.

This also confers, on the finished concrete, insulating properties which are particularly desired currently in the construction field, with a thermal conductivity of less than 0.6 W·m⁻¹·K⁻¹, indeed even of less than 0.5 W·m⁻¹·K⁻¹ in example 2.

Example 3

All the values shown (weight and volume) relate to a volume of fresh concrete of 1 m³.

Formulation 345 kg/m³ of CEM I 52.5 N CE CP2 NF (Gaurain), 148 kg/m³ of Cendres Volantes Carling (Surchiste), i.e. 493 kg/m³ of hydraulic binder, 423 kg/m³ of expanded slatey-schist sand GEM "104" (true density: 1.55 kg/l; water absorption at 24 h: 13%; particle size of less than or equal to 4 mm), 424 kg/m³ of expanded slatey-schist gravel GEM "1048" (true density: 1.46 kg/l; water absorption at 24 h: 5.5%; particle size of greater than 4 mm and less than or equal to 10 mm)

(All of the fine and coarse aggregates are composed here of lightweight aggregates), 2.40 kg/m³ of Axim superplasticizer Cimfluid Adagio 4019 (based on polycarboxylate) (solids content 30% by weight), i.e. 0.7% by weight, with respect to the weight of cement, 1.70 kg/m³ of Axim viscosifying agent Collaxim SF (based on hydroxyethylcellulose) (solids content 40%), i.e. 0.5% by weight, with respect to the weight of cement, 276 kg/m³ of water, i.e. 200 kg/m³ of effective water, that is to say an Effective water/Binder weight ratio of 0.40 (measured according to the standard NF EN 206-1 (April 2004)).

Equipment and Method

The equipment employed is identical to that of example 1.

The kneading protocol followed is the following:

Introduction of the aggregates, cement and fly ash;

The water and the adjuvants are preweighed and set aside;

Kneading for 30 seconds;

Introduction of the addition water over 30 seconds without halting the mixer;

Introduction of the superplasticizer without halting the mixer;
Introduction of the viscosifying agent without halting the mixer;
Kneading for 2 minutes;
Emptying the mixer.

In this example, the viscosifying agent is not dissolved in a fraction of the mixing water and then introduced into the mixer but is introduced directly into the mixer immediately after all of the mixing water and the introduction of the superplasticizer.

Characteristics of the Concrete in the Fresh or Cured State
Temperature of the fresh concrete: 24.6° C.;
Density in the fresh state according to NF EN 12350-6 (April 2012): 1700 kg/m$^3$ of fresh concrete,
Air content of the fresh concrete according to NF EN 12350-7 (April 2012): 0.4% by volume,
Slumping with the Abrams cone according to NF EN 12350-2 (April 2012): 220 mm at the end of kneading,
Compressive strength according to NF EN 12350-3 (April 2012) (cylindrical test specimens with a diameter of 16 cm over a height of 32 cm): 40.4 MPa at 7 days and 51.6 MPa at 28 days,
Total shrinkage at 28 days (storage at 20° C. and 50% relative humidity): 577 µm/m.

Example 4

All the values shown (weight and volume) relate to a volume of fresh concrete of 1 m$^3$.
Formulation
345 kg/m$^3$ of CEM I 52.5 N CE CP2 NF (Gaurain),
148 kg/m$^3$ of Cendres Volantes Carling (Surchiste), i.e. 493 kg/m$^3$ of hydraulic binder,
414 kg/m$^3$ of expanded slatey-schist sand GEM "104" (true density: 1.55 kg/l; water absorption at 24 h: 13%; particle size of less than or equal to 4 mm),
415 kg/m$^3$ of expanded slatey-schist gravel GEM "1048" (true density: 1.46 kg/l; water absorption at 24 h: 5.5%; particle size of greater than 4 and less than or equal to 10 mm)
(All of the fine and coarse aggregates are composed here of lightweight aggregates),
4.14 kg/m$^3$ of Axim superplasticizer Cimfluid Adagio 4019 (based on polycarboxylate) (solids content 30% by weight), i.e. 1.2% by weight, with respect to the weight of cement,
1.72 kg/m$^3$ of viscosifying agent Chrysoplast V90 (based on hydroxyethylcellulose) (solids content 40%), i.e. 0.5% by weight, with respect to the weight of cement,
293 kg/m$^3$ of water, i.e. 218 kg/m$^3$ of effective water, that is to say an Effective water/Binder weight ratio of 0.44 (measured according to the standard NF EN 206-1 (April 2004)).
Equipment and Method
Identical to those of example 3.
Characteristics of the Concrete in the Fresh or Cured State
Temperature of the fresh concrete: 21.2° C.;
Density in the fresh state according to NF EN 12350-6 (April 2012): 1652 kg/m$^3$ of fresh concrete,
Air content of the fresh concrete according to NF EN 12350-7 (April 2012): 3.6% by volume,
Slumping with the Abrams cone according to NF EN 12350-2 (April 2012): 210 mm at the end of kneading,
Compressive strength according to NF EN 12350-3 (April 2012) (cylindrical test specimens with a diameter of 16 cm over a height of 32 cm): 38.8 MPa at 7 days and 42.6 MPa at 28 days,
Total shrinkage at 28 days (storage at 20° C. and 50% relative humidity): 540 µm/m.

Example 5

All the values shown (weight and volume) relate to a volume of fresh concrete of 1 m$^3$.
Formulation
330 kg/m$^3$ of CEM I 52.5 N CE CP2 NF (Gaurain),
145 kg/m$^3$ of Cendres Volantes Carling (Surchiste), i.e. 475 kg/m$^3$ of hydraulic binder,
397 kg/m$^3$ of expanded clay sand AR 0/4 650 Argex (true density under dry conditions: 1.40 kg/l; water absorption at 24 h: 19.9%),
343 kg/m$^3$ of expanded clay gravel AM 4/8 650 Argex (true density under dry conditions: 1.20 kg/l; water absorption at 24 h: 19.0%)
(All of the fine and coarse aggregates are composed here of lightweight aggregates),
2.31 kg/m$^3$ of Axim superplasticizer Cimfluid Adagio 4019 (based on polycarboxylate) (solids content 30% by weight), i.e. 0.7% by weight, with respect to the weight of cement,
1.65 kg/m$^3$ of Axim viscosifying agent Collaxim SF (based on hydroxyethylcellulose) (solids content 40%), i.e. 0.5% by weight, with respect to the weight of cement,
343 kg/m$^3$ of water, i.e. 200 kg/m$^3$ of effective water, that is to say an Effective water/Binder weight ratio of 0.42 (determined according to the standard NF EN 206-1 (April 2004)).
Equipment and Method
Identical to those of example 3.
Characteristics of the Concrete in the Fresh or Cured State
Density in the fresh state according to NF EN 12350-6 (April 2012): 1652 kg/m$^3$ of fresh concrete,
Air content of the fresh concrete according to NF EN 12350-7 (April 2012): 6% by volume,
Slumping with the Abrams cone according to NF EN 12350-2 (April 2012): 210 mm at the end of kneading,
Compressive strength according to NF EN 12390-3 (April 2012) (cylindrical test specimens with a diameter of 16 cm over a height of 32 cm): 24.8 MPa at 7 days and 30.3 MPa at 28 days,
Total shrinkage at 28 days (storage at 20° C. and 50% relative humidity): 696 µm/m.

Example 6

All the values shown (weight and volume) relate to a volume of fresh concrete of 1 m$^3$.
Formulation
Identical to that of example 2.
Equipment and Method
Identical to those of example 2.
The concretes obtained were employed in the construction of a building at Trappes (78190 France). The characteristics presented below are an average of the measurements carried out on control samples.
Characteristics of the Concrete in the Fresh or Cured State
Density in the fresh state according to NF EN 12350-6 (April 2012): 1618 kg/m$^3$ of fresh concrete,
Slumping with the Abrams cone according to NF EN 12350-2 (April 2012): 207 mm at the end of kneading, Compressive strength according to NF EN 12390-3 (April 2012) (cylindrical test specimens with a diameter of 16 cm over a height of 32 cm): 22.8 MPa at 7 days and 26.9 MPa at 28 days.

Example 7

All the values shown (weight and volume) relate to a volume of fresh concrete of 1 m$^3$.
Formulation
Identical to that of example 2.
Equipment and Method
Identical to those of example 2.

The concretes obtained were employed in the construction of a building at Athis-Mons (91200 France). The characteristics presented below are an average of the measurements carried out on control samples.

Characteristics of the Concrete in the Fresh or Cured State

Density in the fresh state according to NF EN 12350-6 (April 2012): 1620 kg/m$^3$ of fresh concrete, Air content of the fresh concrete according to NF EN 12350-7 (April 2012): 2.9% by volume, Slumping with the Abrams cone according to NF EN 12350-2 (April 2012): 220 mm at the end of kneading, Compressive strength according to NF EN 12390-3 (April 2012) (cylindrical test specimens with a diameter of 16 cm over a height of 32 cm): 20.4 MPa at 7 days and 26.9 MPa at 28 days, Dry density after drying in the oven at 105° C.: 1347 kg/m$^3$ of dry concrete, Thermal conductivity after drying in the oven at 105° C.: 0.46 W·m$^{-1}$·K$^{-1}$.

The invention claimed is:

1. A lightweight structural concrete or mortar composition comprising, in a fresh state, a hydraulic binder, aggregates and water, comprising:
    a content of hydraulic binder, including cement and optional admixtures, of greater than or equal to 280 kg/m$^3$ of fresh concrete;
    coarse aggregates having a size of greater than 4 mm and/or fine aggregates having a particle size of less than or equal to 4 mm, a proportion by volume of at least 70% of said fine and/or coarse aggregates being composed of fine and/or coarse lightweight particles, a true density of which in a dry state is between 800 and 1600 kg/m$^3$, a total amount of aggregates being greater than or equal to 500 l/m$^3$ of fresh concrete;
    a superplasticizer;
    at least one viscosifying agent; and
    effective water according to an effective water/hydraulic binder weight ratio of between 0.40 and 0.65.

2. The composition as claimed in claim 1, wherein the hydraulic binder comprises a cement selected from the group consisting of CEM I, CEM II, CEM III, CEM IV and CEM V cements, a sulfoaluminous clinker and a mixture of these.

3. The composition as claimed in claim 1, wherein the proportion of hydraulic binder is at least 300 kg/m$^3$ of fresh concrete.

4. The composition as claimed in claim 1, wherein the hydraulic binder is a cement comprising a mixture of a of sulfoaluminous clinker and of a CEM I cement.

5. The composition as claimed in claim 1, wherein the hydraulic binder comprises admixtures, in the form of fine particles having a size of less than 125 micrometers, which are fillers selected from the group consisting of limestone fillers, siliceous fillers, fumed silicas, fly ash, blast furnace slags and metakaolins.

6. The composition as claimed in claim 1, wherein the fine or coarse lightweight particles are mineral particles of natural or artificial origin selected from the group consisting of pumice, expanded clays, expanded schists, expanded slags or expanded pelletized slags, expanded glasses, expanded aggregates based on marble, granite, slate, ceramic and a mixture of several of these.

7. The composition as claimed in claim 1, wherein the fine lightweight particles are expanded clays or expanded schists with a true density in the dry state of between 1000 kg/m$^3$ and 1400 kg/m$^3$.

8. The composition as claimed in claim 1, wherein the coarse lightweight particles are expanded clay or schist gravel having a true density in the dry state of between 1000 and 1400 kg/m$^3$, with a maximum size of 14 mm and with a crush strength at least greater than 4 N/mm$^2$.

9. The composition as claimed in claim 1, wherein the total volume of the aggregates represents at least 530 l/m$^3$ of fresh concrete.

10. The composition as claimed in claim 1, wherein the viscosifying agent is selected from the group consisting of cellulose ethers, polysaccharides, hydroxyalkylcelluloses, hydroxyethylcelluloses, methylcellulose, carboxymethylcellulose, hydroxyethylcellulose ethylhydroxyethylcellulose, polyethylene oxide)s, polyvinyl alcohols and polyamides.

11. The composition as claimed in claim 10, wherein said viscosifying agent is a hydroxyalkylcellulose.

12. The composition as claimed in claim 10, wherein said viscosifying agent is a formulation comprising hydroxyethylcellulose, attapulgite and a siliceous filler in an aqueous K$_2$CO$_3$ solution.

13. The composition as claimed in claim 1, wherein the proportion of said viscosifying agent represents between 0.05% and 2% of the weight of the cement.

14. The composition as claimed in claim 1,
    comprising a superplasticizer selected from the group consisting of polynaphthalenesulfonates, polymelaminesulfonates, lignosulfonates polycarboxylates, and a polycarboxylate derivative with polyethylene oxide side chains.

15. The composition as claimed in claim 14, wherein the content of superplasticizer is less than 2.5% by weight of the cement.

16. The composition as claimed in claim 1, wherein the effective water represents from 200 to 300 l/m$^3$ of fresh concrete.

17. A process for the preparation of a structural lightweight insulating concrete or mortar composition as claimed in claim 1, comprising, before the mixing of the constituents of the composition, at least one stage in which the fraction of aggregates composed of lightweight particles is prewetted and saturated with water.

18. A structural lightweight concrete or mortar having a composition in accordance with claim 1, which exhibits a density of less than 1500 kg/m$^3$ in the dry state and a thermal conductivity of less than or equal to 0.6 W/m·K.

19. A structural lightweight insulating concrete or mortar prepared from a composition as claimed in claim 1, which exhibits a density of less than 1500 kg/m$^3$ in the dry state and a compressive strength of at least 25 MPa after 28 days.

20. A method for producing a self-placing lightweight concrete, comprising mixing the composition as claimed in claim 1 with water.

* * * * *